March 29, 1949. H. J. BRUSHABER 2,465,844
FITTING OF CONNECTING BX
CABLES TO OUTLET BOXES
Filed Nov. 5, 1947
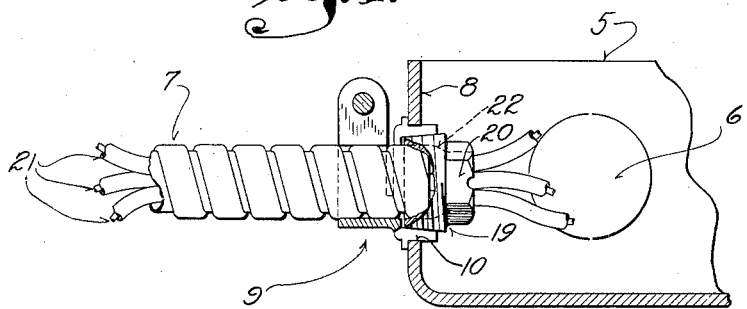
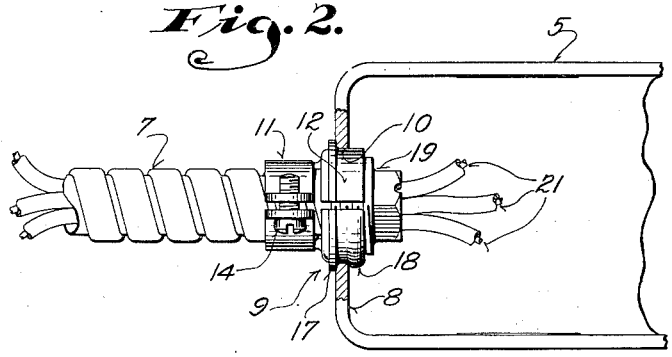
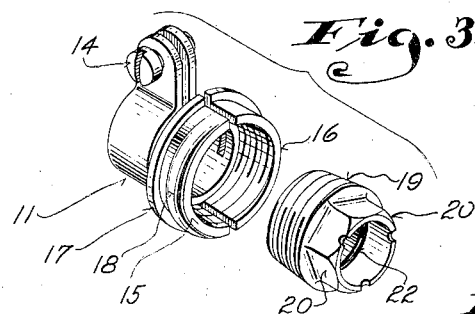
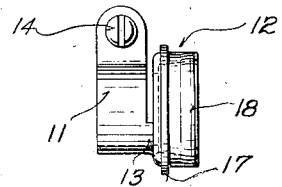
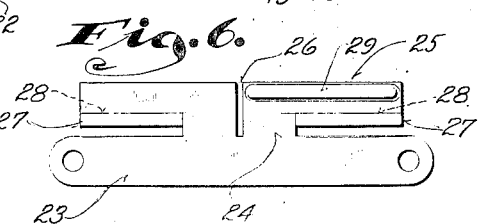
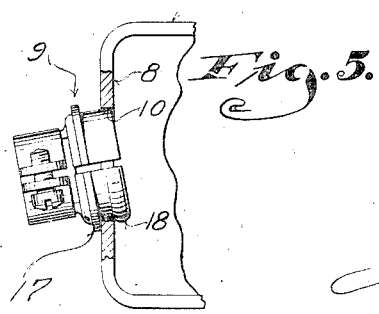
Inventor
Herman J. Brushaber Patented Mar. 29, 1949

2,465,844

UNITED STATES PATENT OFFICE 2,465,844

FITTING OF CONNECTING BX CABLES TO OUTLET BOXES

Herman J. Brushaber, Milwaukee, Wis.; Ralph E. Brushaber executor of said Herman J. Brushaber, deceased Application November 5, 1947, Serial No. 784,261

4 Claims. (Cl. 285—6.5)

This invention relates to electrical conduit fittings and refers particularly to a fitting for connecting BX cable and the like to an outlet box. BX cable consists of a plurality of insulated wires within a sheath formed essentially of a spirally wound metal ribbon. It is supplied in different nominal sizes but its actual outside diameter varies considerably from the nominal diameter. Hence, the anchorage of such cables to outlet boxes has always presented a problem.

Through experience it has been found best to grip the cable by means of a split clamping ring which embraces the cable and has its ends drawn together by the clamping screw, but the means heretofore employed for anchoring the split clamping ring to an outlet box was no match for the simplicity and effectiveness of the clamping ring.

It is, therefore, an object of this invention to provide a fitting wherein the manner of anchoring the fitting to a wall of an outlet box is extremely simple and effective.

Another object of this invention is to provide a fitting adapted to anchor BX cable to an outlet box wherein the securement of the fitting to the wall of the outlet box is quickly and easily effected by simply screwing a tapered plug into the fitting.

Still another object of this invention is to provide a fitting of the character described which is so designed and constructed that when secured to the wall of an outlet box the hole in which the fitting is secured is substantially entirely closed.

A still further object of this invention is to provide a fitting for the purpose set forth which can be produced at a very low cost.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a sectional view through part of a conventional outlet box illustrating the fitting of this invention applied thereto;

Figure 2 is a top view of the structure shown in Figure 1 with the wall of the outlet box partially broken away and in section;

Figure 3 is a perspective view of the component parts of the fitting;

Figure 4 is a side view of the fitting per se;

Figure 5 is a top plan view showing part of an outlet box and the fitting in the act of being applied thereto; and Figure 6 is a plan view of a stamped blank from which the fitting of this invention may be produced as a stamping.

Referring now particularly to the accompanying drawing, the numeral 5 designates a conventional outlet box provided with knockouts 6 in its side and end walls which upon being punched out form holes for the reception of fittings by which conduit and cable may be anchored to the outlet box.

In the present case a BX cable 7 is shown anchored to a wall 8 of the outlet box by means of the fitting of this invention indicated generally by the numeral 9. The fitting is inserted into and secured in a hole 10 formed in the wall 8 by punching out its knockout 6. The fitting comprises two integrally connected but relatively independent parts, namely, a split clamping ring 11 and a bushing 12. These parts are connected by an arcuate neck 13 formed as an extension projecting from the side of the clamping ring. The arcuate length of the neck or extension 13 is considerably less than the circumference of the clamping ring or bushing so as not to interfere with independent radial expansion and contraction of the clamping ring and bushing.

The clamping ring 11 is of a size to embrace a BX cable of the nominal size for which the fitting is designed and its ends are adapted to be drawn together by a clamping screw 14. The bushing 12 is split longitudinally into two bushing sections 15 and 16. The line of the split between these sections substantially bisects the arcuate neck or extension 13 so that the neck or extension joins both bushing sections to the clamping ring 11.

Near its end connected to the clamping ring, the bushing 12 has an annular shoulder 17 extending for the full arcuate length of each bushing section so that in effect the shoulder extends around the entire circumference of the bushing. This shoulder engages with the outer face of the wall of the outlet box when the fitting is in place to secure the fitting against inward displacement.

At the opposite or inner end of the bushing, one section 15 thereof, has an abutment 18 formed thereon. This abutment is more or less localized as to the circumference of the bushing and in the present case has its maximum height at the middle of the bushing section and a gradually decreasing height at opposite sides thereof to merge with the diameter of the bushing near the side edges of the section 15. The maximum height of the abutment does not exceed that of the shoulder 17 and is such that by tilting the bushing as shown in Figure 5 it is possible to insert the same into the hole in which it is to be mounted.

To secure the bushing in place a hollow tapered screw threaded plug 19 is threaded into the bushing which, of course, is provided with a correspondingly tapered tap. As will be readily apparent, threading the plug 19 into the bushing expands its sections into snug engagement with the edges of the hole to securely clamp the bushing to the wall of the outlet box and with the shoulder 17 effective to preclude endwise displacement in an inward direction and the abutment 18 effective to prevent endwise displacement in an outward direction.

To enable tightening the plug 19 a hexagonal head 20 is formed thereon. This head is of substantial size and as compared to the difficulty of tightening the clamping nut used on the conventional form of BX cable anchorage fitting, is readily accessible and easily manipulated.

Inasmuch as the plug 19 is hollow the conductor wires 21 which constitute part of the BX cable can be brought into the outlet box for the establishment of the connections to be made therein. The extent to which the sheath of the cable projects into the bushing is limited by a shoulder 22 on the inside of the plug against which the end of the cable sheath bears.

The fitting can be made in any desired manner, for instance as a die-casting, but as shown in Figure 6, with but slight modification from the specific structure thus far described, it lends itself well to production as a stamping. To enable its production as a stamping it is only necessary to omit part of the shoulder 17. In all other respects the finished fitting, formed as a stamping, will be identical with that described.

The blank shown in Figure 6 from which the fitting can be formed as a stamping consists of an elongated round ended portion 23 joined by a narrow neck 24 to a portion 25 longitudinally split as at 26. The split 26 divides the portion 25 into two sections which, when the fitting is formed up, constitute the two halves of the bushing 12. The elongated strip 23, of course, produces the clamping ring and the neck 24 provides the juncture between the clamping ring and the bushing. The shoulder 17 is formed by bending flanges 27 along the lines 28 and the abutment 18 is produced by punching out an oval shaped protrusion 29.

The appearance of the fitting when formed up from the blank shown in Figure 6 will be substantially the same as that illustrated in Figure 3.

From the foregoing description taken in connection with the accompanying drawing, it will be readily apparent to those skilled in the art that this invention provides a practical, inexpensive fitting for anchoring or attaching BX cable to outlet boxes and the like.

What I claim as my invention is:

1. A fitting for anchoring BX cable and the like to an outlet box comprising: a flanged bushing adapted to be inserted into a hole in an outlet box with the flange thereof bearing against the outer face of the box, said bushing having its portion which is insertable into the hole in the outlet box split to allow expansion of the bushing into snug engagement with the edges of the hole; an abutment on the bushing spaced from its flange a distance substantially equal to the wall thickness of an outlet box, said abutment extending for only a portion of the circumference of the bushing so as to enable insertion of the bushing into a hole in an outlet box; a hollow plug threaded into the split bushing and adapted to expand the bushing radially against the edges of a hole in which it is received; and a split clamping ring carried by the bushing and adapted to receive and securely grip a BX cable inserted into the bushing.

2. A fitting for anchoring BX cable to a wall of an outlet box or the like, comprising: a bushing having an inner and an outer end and split longitudinally from its inner end; an annular shoulder on the bushing near its outer end, said shoulder limiting insertion of the bushing, inner end foremost, into a hole in a wall of an outlet box; an abutment on the bushing spaced from the annular shoulder and adapted to engage the inner edge of a hole into which the bushing is inserted, said abutment being circumferentially short so as to enable insertion of the bushing into a hole in a wall of an outlet box by tilting the same to first insert the abutment; a taper-threaded hollow plug threaded into the bushing to expand the same radially into snug engagement with the edges of the hole; and means on the outer end of the bushing for gripping a BX cable received in the bushing.

3. A fitting of the character described comprising: a split clamping ring adapted to embrace a BX cable of the nominal size for which the fitting is designed; means for drawing the ends of the clamping ring together; a split bushing; a connection between the clamping ring and the bushing comprising, an arcuate extension on the side of the clamping ring integrally joined to each section of the bushing, said extension having an arcuate length substantially less than the circumference of the clamping ring and/or the bushing so as not to preclude radial expansion and contraction of the clamping ring and bushing; a shoulder on the exterior of the bushing near the end thereof which is joined to the arcuate extension; an abutment on one of the bushing sections near the other end of the bushing, said abutment protruding but slightly from the side of the bushing so that by tilting the bushing it may be inserted into a hole in a wall only slightly larger than the diameter of the bushing, to bring the shoulder against the outer face of the wall; and a tapered hollow screw-threaded plug threaded into the bushing from its inner end to expand the sections thereof radially into snug engagement with the edges of the hole with the wall interposed between the shoulder and said abutment.

4. A fitting of the character described comprising: a unitary sheet metal stamping having a portion thereof defining a split clamping ring and another portion shaped to provide a cylindrical bushing split longitudinally into sections; a narrow neck joining said bushing sections with the clamping ring, said neck being substantially bisected by an imaginary extension of the split in the bushing; a shoulder on the end of the bushing adjacent to the clamping ring consisting of flanges bent out from the adjacent ends of the bushing sections; an outward protrusion on one of the bushing sections providing an abutment to coact with the shoulder in locating the bushing on a supporting wall; means for drawing the ends of the clamping ring together; and means for spreading the bushing sections radially outward.

HERMAN J. BRUSHABER.

No references cited.